US006925196B2

(12) United States Patent
Kass et al.

(10) Patent No.: US 6,925,196 B2
(45) Date of Patent: Aug. 2, 2005

(54) METHOD AND SYSTEM FOR PRODUCT SELECTION

(75) Inventors: Ronald Kass, New York, NY (US); David E. Bright, New York, NY (US); Paul Luba, Warwick, RI (US)

(73) Assignee: The Robert Allen Group, Mansfield, MA (US)

( * ) Notice: Subject to any disclaimer, the term of this patent is extended or adjusted under 35 U.S.C. 154(b) by 699 days.

(21) Appl. No.: 10/051,281

(22) Filed: Jan. 22, 2002

(65) Prior Publication Data

US 2002/0106111 A1 Aug. 8, 2002

Related U.S. Application Data

(60) Provisional application No. 60/264,714, filed on Jan. 30, 2001.

(51) Int. Cl.[7] .................................................. G06K 9/00
(52) U.S. Cl. ........................ 382/111; 382/165; 345/593; 434/72
(58) Field of Search ................................ 382/111, 165, 382/189, 203, 209, 214, 305; 705/26; 356/238.1, 238.2, 429; 434/72; 700/130, 131, 144; 428/292.1, 13, 207; 345/593

(56) References Cited

U.S. PATENT DOCUMENTS

| | | | | |
|---|---|---|---|---|
| 4,703,943 A | | 11/1987 | Zelenko et al. ................ 281/21 |
| 4,744,378 A | | 5/1988 | Bostic ........................ 132/88.5 |
| 4,843,574 A | | 6/1989 | Gerber ........................ 364/526 |
| 5,688,125 A | * | 11/1997 | Birdsong-Raffo ............ 434/72 |
| 5,737,230 A | * | 4/1998 | Robinson, Jr. ............... 700/122 |
| 5,751,829 A | * | 5/1998 | Ringland et al. ........... 382/100 |
| 5,791,381 A | * | 8/1998 | Lepka et al. .................... 139/68 |
| 5,966,454 A | * | 10/1999 | Thomas et al. .............. 382/111 |
| 6,011,540 A | * | 1/2000 | Berlin et al. ................. 345/601 |
| 6,052,669 A | | 4/2000 | Smith et al. .................. 705/26 |
| 6,122,391 A | * | 9/2000 | Ringland et al. ........... 382/100 |
| 6,130,746 A | | 10/2000 | Nevel et al. .............. 356/238.2 |
| 6,137,487 A | * | 10/2000 | Mantha ....................... 715/767 |
| 6,167,383 A | | 12/2000 | Henson |
| 6,310,969 B1 | * | 10/2001 | Kim et al. .................. 382/162 |
| 6,381,510 B1 | | 4/2002 | Amidhozour et al. |
| 2001/0034668 A1 | | 10/2001 | Whitworth |
| 2001/0047309 A1 | | 11/2001 | Bartholomew et al. |
| 2001/0049644 A1 | | 12/2001 | Webb et al. |
| 2002/0006602 A1 | * | 1/2002 | Masters ........................ 434/72 |
| 2002/0010655 A1 | | 1/2002 | Kjallstrom |
| 2002/0022506 A1 | * | 2/2002 | Rifkin ............................ 463/1 |
| 2002/0052799 A1 | | 5/2002 | Starikov |
| 2002/0154176 A1 | * | 10/2002 | Barksdale et al. .......... 345/853 |
| 2004/0012542 A1 | * | 1/2004 | Bowsher et al. .............. 345/10 |

OTHER PUBLICATIONS

"Selecting Fabrics"—Ackerman's Furniture Workshops @ www.ackermans.com.
"Selecting Cotton Upholstery and Decorative Fabrics"—Cotton Incorporated @ www.cottoninc.com.
International Search Report, International application No. PCT/US02/01501, dated Sep. 12, 2002.
"Furniture Consultants Assist Busy Customers" The Saturday Oklahoman, Aprl 3, 1999.

* cited by examiner

Primary Examiner—Bhavesh M. Mehta
Assistant Examiner—Barry Choobin
(74) Attorney, Agent, or Firm—George T. Marcou; Kilpatrick Stockton LLP

(57) ABSTRACT

A method and system for guiding consumers through a sophisticated evaluation process for selecting a product that satisfies desired aesthetic and physical objectives. An embodiment of the method and system enables a consumer from his/her home to select a fabric by systematically and efficiently evaluating a multitude of colors, as well as, other criteria, such as, design and material construction. From a virtual showroom of swatches, the system presents the consumer an image of the swatches that best satisfy the selected criteria.

20 Claims, 12 Drawing Sheets

METHOD AND SYSTEM FOR PRODUCT SELECTION

CROSS-REFERENCE TO RELATED APPLICATIONS

This application claims priority to, and herein incorporates by reference in its entirety, Applicant's copending U.S. Provisional Application No. 60/264,714 filed Jan. 30, 2001.

FIELD OF THE INVENTION

The present invention relates generally to a method and system for identifying products that satisfy certain aesthetic and physical criteria. More particularly, but not by way of limitation, the invention relates to a novel web-based method and system for guiding consumers in the selection of a material based on factors such as color, design, intended use of the material, and manner of construction of the material.

BACKGROUND

Good design does not just happen, except in nature. Instead, design involves a conscious, subjective process of selecting and organizing materials and objects in a visually pleasing way. When well executed, good design is as functional and comfortable as it is beautiful. But design is not just the province of interior decorators, designers, and architects. Every time the average consumer chooses a paint color or arranges furniture in a room, they are making design decisions.

While there are basic guidelines for those design decisions, the most important tool a consumer has is his/her eyes. Consumers must be observant, have options, learn to recognize things that please them, and analyze why.

Color, space, line, texture and pattern are all critical in decorating. A successful mix of these factors helps achieve a balanced, visually appealing scheme. Among those factors, color is perhaps the most powerful decorating tool at one's disposal. While the human eye can discern more than six million colors, only a fraction of those are generally used in decorating and design.

Because it is difficult to use words to describe what is visual, it is important that the basic terminology of color be understood. The color wheel is a useful tool when discussing color fundamentals. FIG. 1 shows a simplified color wheel. The color wheel shows the basic twelve colors in their pure form. The primary colors, red 1, blue 2 and yellow 3, make up all other colors. Secondary colors lie midway between the primary colors on the color wheel. These colors come from combining the primary colors: yellow 3+red 1=orange 4; yellow 3+blue 2=green 5; and red 1+blue 2=violet 6 (often called purple). Intermediate colors result from mixing a primary color with an adjacent secondary color on the color wheel. For example, red 1 (a primary) and violet 6 (a secondary) combine to make red-violet 7. There are six intermediate colors on the color wheel: yellow-green 8, blue-green 9, blue-violet 10, red-violet 7, red-orange 11 and yellow-orange 12. Not only do colors have these fundamental structures, but they also have characteristics; the qualities that give colors personality and character. These characteristics include, hue, value, and temperature.

Hue is just another word for color. Turquoise and crimson are hues; so are softer colors like lilac and butter cream. The terms hue and color are used interchangeably.

Value refers to the lightness or darkness of a color. Of course, there are infinite variations in value, from the lightest lights to the darkest darks. Mint, for example, is a light value of green. Navy is a dark value of blue. Each pure color has a natural value; that is, yellow is naturally light, while violet is naturally dark. Light-value colors are pale versions of the pure colors. Pink is a light value of red. Peach is a light value of orange. And iris is a light value of blue-violet. Light-value colors are not limited to colors referred to as "pastels." Lavender, melon and coral are light-value colors, but they are stronger than hues that might be used in a nursery. Medium-value colors are midway on the scale of light to dark. Dark-value colors often have descriptive names—spice, indigo and walnut, for example. Shade is a color that has been darkened by the addition of black or a darker color.

Temperature is an aspect of color that is generally easy to grasp. Referring to FIG. 1, if an imaginary line is drawn on the color wheel from red-violet 7 to yellow-green 8, the colors to the left—yellows, reds and oranges—are the warm hues. Warm colors are considered to be "advancing" because they seem as though they are coming closer to the viewer. On walls, warm colors can make a room feel cozy and enveloping. The colors to the right of that imaginary line on the color ring—greens, blues and violets—are the cool hues. They appear to be farther away, which is why they are called "receding" colors. On walls, cool colors can make a room feel spacious and calm. Visual temperature is relative. Red-violet and yellow-green may seem warm or cool, depending on the presence of other colors. Next to orange, red-violet looks cool; next to blue, it looks warm. Visual temperature comes into play when colors are combined in a decorating scheme. In general, the juxtaposition of warm and cool color intensifies each. If one room is painted a warm red and an adjoining room a cool green, each will seem more intensely warm or cool. This effect also works within a room; cool walls make a warm wood floor seem even warmer.

As previously stated, color is perhaps the most powerful design tool. Most consumers and professionals begin decorating and design projects with a discussion of color and color schemes. For most items, however, color is just one of the choices that must be made. For each color there are generally many choices of patterns and designs to choose from. This is certainly true for fabrics, leather, rugs, carpet and trim, where the variety of designs and patterns to choose from can be mind numbing.

Traditionally, consumers and professionals have been forced to travel to showrooms to look at all the different patterns, designs, and colors available for a certain item. Once at the showroom, consumers are then forced to ferret through large, heavy volumes of swatches showing the various patterns, designs, and color combinations available. After going through this time consuming process, consumers are often left with a handful of swatches which they must then take back home so that they can be matched against existing materials.

Accordingly, there is a need for an improved method and system for not only selecting products that correspond to limited/basic colors, but also a method and system that efficiently and systematically presents for consideration variations of the initially selected color. Further, there is a need for a method and system that presents for consideration a multitude of aesthetic (e.g., designs) and physical features (e.g., the material and manner of construction) of products in an efficient and effective manner.

SUMMARY OF THE INVENTION

The present invention overcomes the above-noted and other shortcomings by providing a novel and improved method and system that meet the aforementioned needs.

Recognizing the onerous and overwhelming nature of certain product selection activities, the present invention is drawn to a method and system for guiding consumers through a decision-making process for identifying a product that best satisfies the desired aesthetic and physical objectives. Color is a powerful design tool, however, as discussed, colors have a variety of characteristics that elevates the decision making process, especially when other aesthetic and physical factors, such as the product's construction and ornamental design are to be considered.

An embodiment of the present invention provides for a novel method and system to guide consumers through a sophisticated color selection process, as well as, other selection processes in a systematic and efficient manner. The consumer, from the comfort of his/her home or office may access the Internet and be guided through a systematic and efficient process for selecting a product that satisfies the desired aesthetic and physical objectives.

A further embodiment of the present invention is an automated method for identifying products that possess certain aesthetic and physical features, comprising the steps of: displaying a list of product offerings to a user, the product offerings organized by product area; displaying samples of colors to apply to a product offering; and displaying samples of variations of a color selected by the user. The embodiment further provides for displaying an aesthetic criterion for the product; displaying a list of options categorized within the aesthetic criterion; displaying a physical criterion for the product; displaying a list of options categorized within the physical criterion; and comparing the selected product offering with the variation of color, aesthetic criterion, and physical criterion selected by the user.

Additionally, the embodiment includes displaying an image of at least one product from the selected product offering that corresponds to the variation of color, aesthetic criterion, and physical criterion selected by the user; and providing a description of the product, wherein the product is a fabric or trim. The embodiment also displays an object, such as a sofa or another type of furnishing, and applies the image of the product to the image of the object, thereby modifying the appearance of the object.

A further embodiment of the present invention includes a computer system for identifying products that possess certain aesthetic and physical features, comprising: a communications component, wherein the communications component: displays product offerings to a user; displays samples of colors to apply to a product offering; displays samples of variations of a color selected by the user; indicates a variation of a color selected by the user; displays an aesthetic criterion for the product area; displays a list of options categorized within the aesthetic criterion; displays a physical criterion for the product area; and displays a list of options categorized within the physical criterion.

The embodiment further includes a data storage component containing information regarding the product offering from the selected product group for comparison with the variation of color, aesthetic criterion, and physical criterion selected by the user, wherein the communications component sends the user an image of at least one product from the selected product group that corresponds to the variation of color, aesthetic criterion, and physical criterion selected by the user; and wherein the communications component sends the user a description of the at least one product.

A further embodiment of the present invention pertains to the selection of fabrics and trims for home furnishings to allow users not only to search for swatches that match their selected criteria, but also to allow users to see how a chosen fabric or trim may look on a particular furnishing. An embodiment of this inventive process includes the following: User selects an image of an object of interest (e.g., sofa) from a listing or inputs an image (e.g., through use of a scanner) into the inventive system; the object of interest is displayed, for example, in an all white color or its original color; the user proceeds through the process as discussed in this disclosure (for example, selecting a color family and other criteria); user selects a swatch of fabric among several swatches that match the selected criteria; and the image of the object of interest (e.g., sofa) is updated so that it is virtually upholstered with the swatch design. This image may also be printed by the user and compared with other furnishings within the home. The process need not be performed in this particular order, for example, the selection of the object of interest may occur after the desired swatch has been identified. Further, the inventive process may not include all of the illustrated steps, and/or may include additional steps.

It will be apparent to those skilled in the art that various modifications and variations can be made in the inventive system and methodology without departing from the scope or spirit of the invention.

Other advantages and novel features of the present invention will become apparent in the following detailed description when considered in conjunction with the accompanying drawings.

BRIEF DESCRIPTION OF THE DRAWINGS

The file of this patent contains at least one drawing executed in color. Copies of this patent with color drawing(s) will be provided by the Patent and Trademark Office upon request and payment of the necessary fee.

The present invention is shown by way of example and not by limitation in the accompanying figures, in which.

DETAILED DESCRIPTION

Reference will now be made in detail to embodiments of the invention, one or more examples of which are illustrated in the accompanying figures. Each example is provided by way of explanation of the invention, not as a limitation of the invention. It will be apparent to those skilled in the art that various modifications and variations can be made in the present invention without departing from the scope or spirit of the invention. For instance, features illustrated or described as part of one embodiment can be used on another embodiment to yield a still further embodiment. Thus, it is intended that the present invention cover such modifications and variations that come within the scope of the appended claims and their equivalents.

Figure 1:
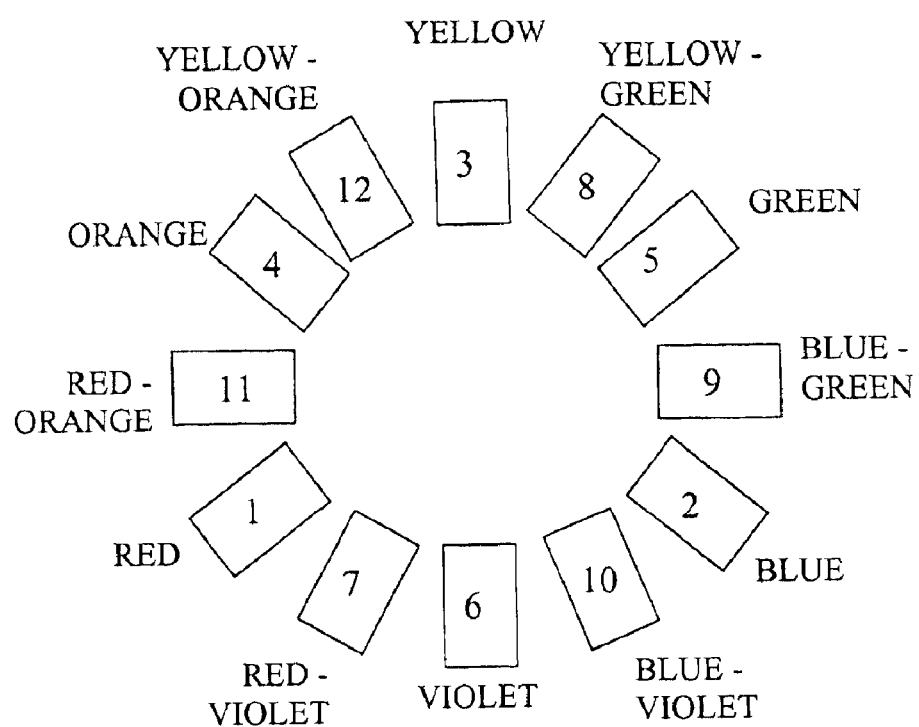
FIG. 1 is a illustration of a color wheel.
Figure 2:
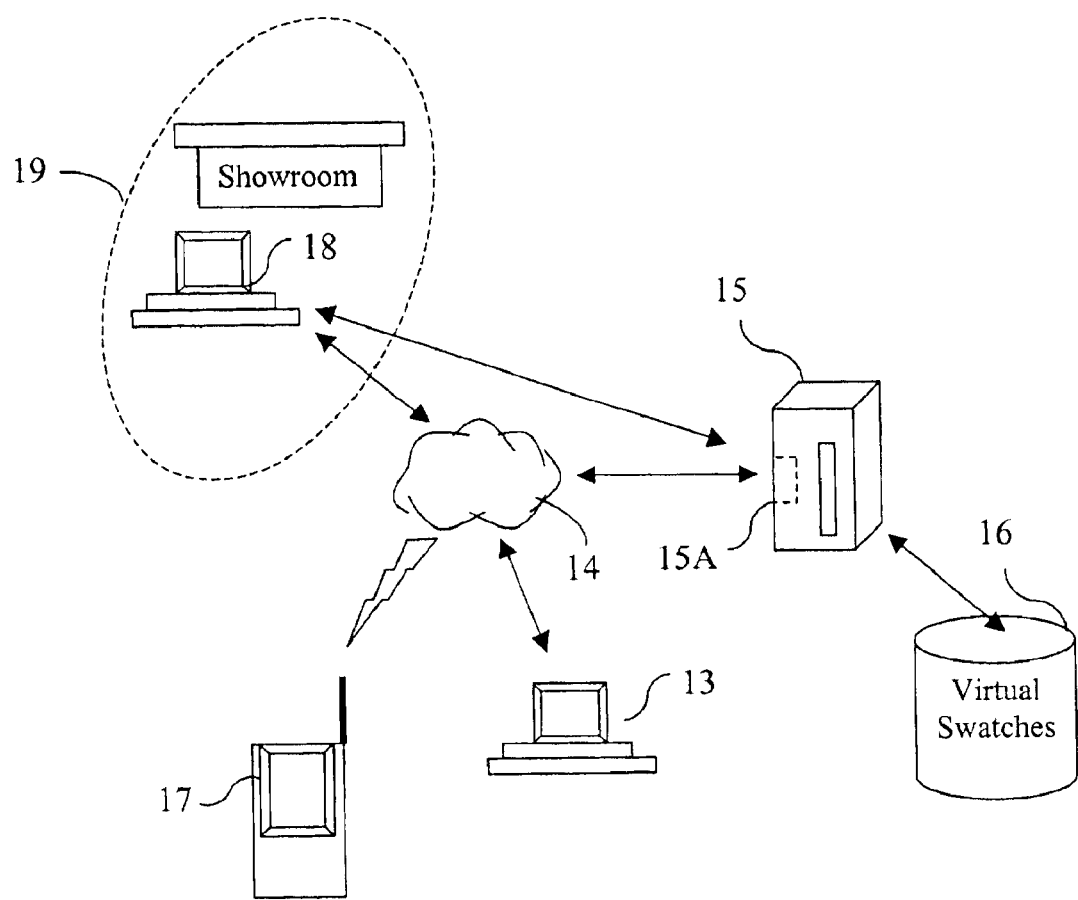
FIG. 2 depicts a computer network for an embodiment of the present invention.

As seen in FIG. 2, an embodiment of the method and system that is the subject of the present invention may be implemented on an open network, such as the Internet 14, wherein home personal computers 13 are connected to a server 15 in order for consumers to view, for example, swatches of fabric from a virtual library. The server 15 has known components, for example, a communications component 15A for interacting with the users and a data storage component 16 for maintaining electronic files. Other embodiments include closed networks. Further, kiosk computers 18 at a merchant 19 may also used to view the virtual swatches. Embodiments also include the use of wireless microcomputers 17, for example, Personal Digital Assistants (PDAs). The present invention may also be provided to a user on a computer readable medium, for example, a compact disk. Much of this disclosure will use the Internet implementation, as an example.

Figure 3:
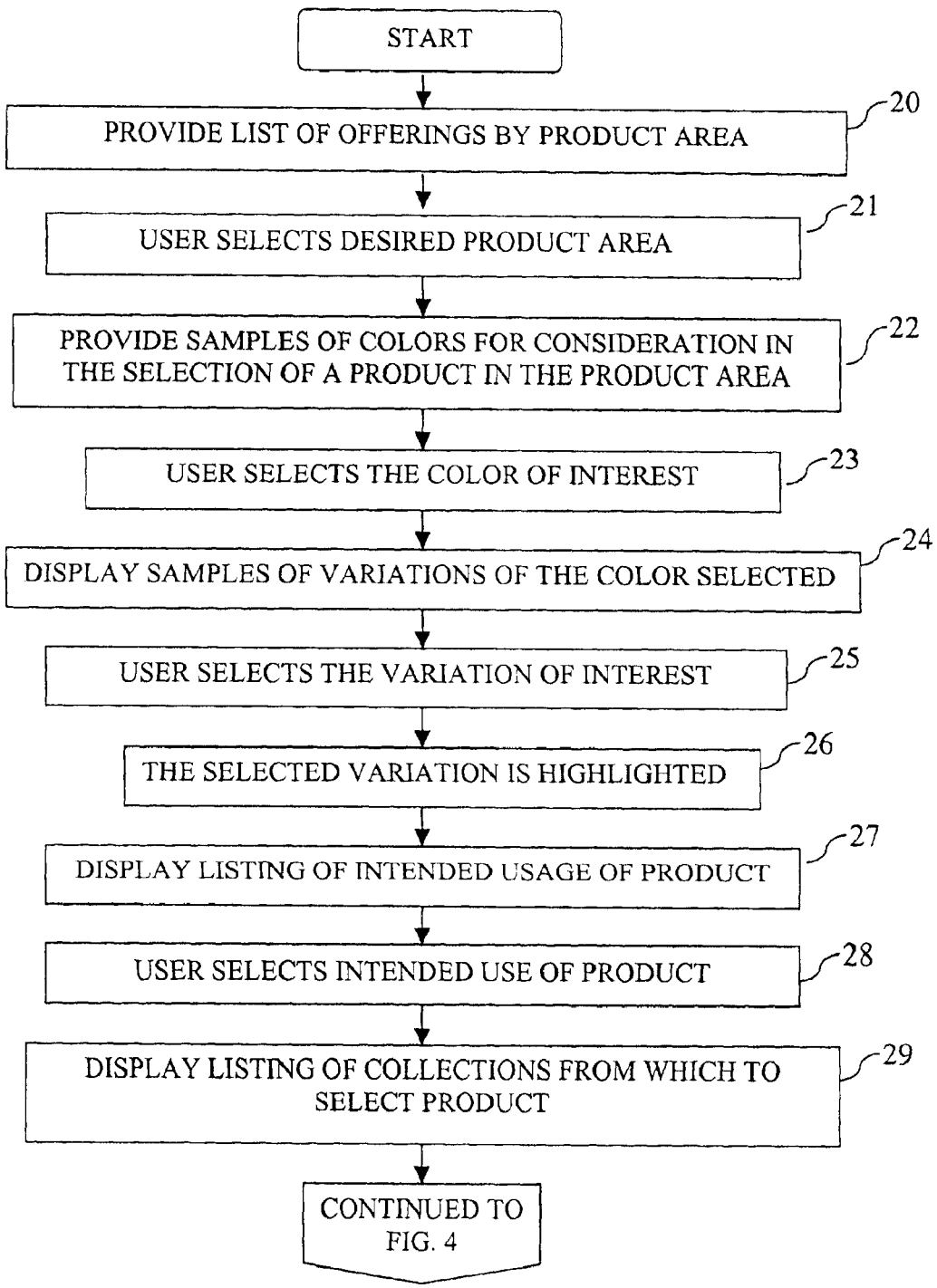
FIG. 3 is a flow diagram of an embodiment of the present invention.
Figure 4:
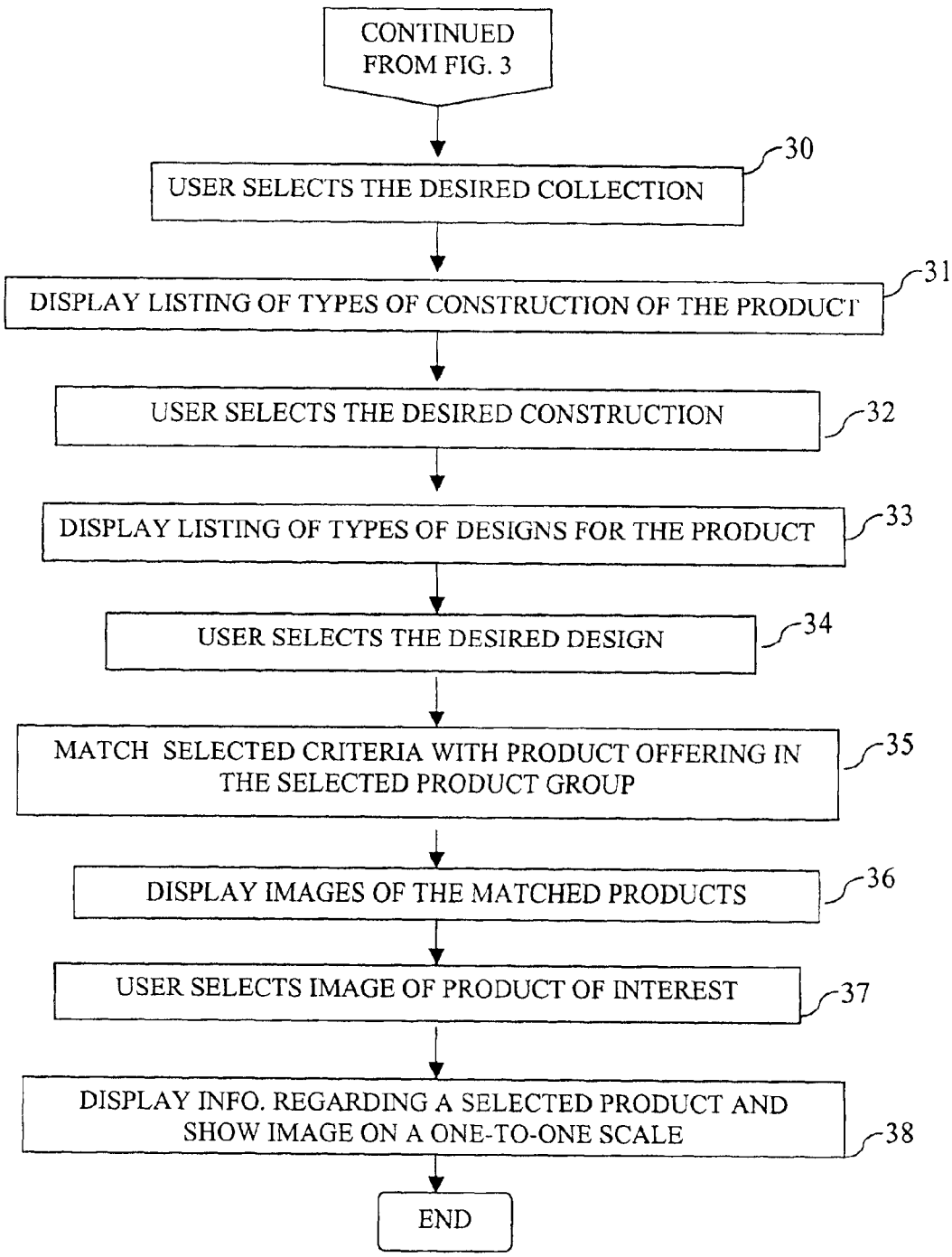
FIG. 4 is the flow diagram continued from FIG. 3.

Referring to FIG. 3, a flow chart of an embodiment of the present invention is shown. In this embodiment, a merchant provides access to a website on the Internet to enable a user to methodically identify a product that matches the physical and aesthetic attributes desired by a consumer. The present invention, however, is not limited to a merchant-consumer context, but is also applicable to those situations where there is no product to sell. For example, the present invention may be used for educational and entertainment purposes. Further, the present invention need not be limited to identifying fabrics for home or office furnishings, but may also be used to identify a design for clothing, mechanical structures, transportation conveyances, and any other inanimate or animate object.

Returning to FIG. 3, a merchant's website displays at least one product area or group in which a consumer may be interested 20. For example, the consumer may be interested in purchasing upholstery, and would therefore select a product area that would include upholstery 21. In response to the consumer's selection of the product area of interest, the website presents a first criterion to help the consumer narrow his/her choices among the many number of products to choose. In this embodiment, samples of colors are shown to the consumer to help him/her select the most appropriate upholstery 22. The consumer responds by selecting a color of interest 23. Then, in a systematic manner, the website presents samples of variations of the color selected 24. For example, the variation of the color selected may include characteristics, such as a different hue, value, shade, temperature, etc.

The consumer is then asked to select the "shade" of interest 25. The use of the term "shade" is not meant to be limiting, but rather as an abbreviated and simplistic way to refer to color variation (hue, value, shade, temperature, etc.) of the initial color selected. The selected "shade" is then highlighted 26 and the consumer is then queried as to how the product will be used 27. The consumer then selects how the product is intended to be used from a list of uses 28.

Further criteria are then presented to the consumer to help narrow his/her choices based on the consumer's desired physical and aesthetic attributes for the product. The website provides a listing of collections, for example in this scenario, designer collections, from which to select an upholstery 29. The consumer then selects the desired collection or selects no preference 30. Next, to continue the upholstery example, the consumer is presented with a listing of the types of upholstery construction that are available 31. The consumer then selects the construction of interest 32. The website also presents different designs 33 for consideration and selection 34.

At this point, the consumer enters his/her selected criteria so that the inventive system can search its database for matching products 35, or as in the present example, matching swatches. Images, for example thumbnail images, of the products that match the criteria are then displayed on the screen 36. The consumer is then able to select the desired product 37 whereby further information regarding the product is presented and, in certain embodiments, an enlarged one-to-one scaled image of the product is shown 38.

Figure 5:
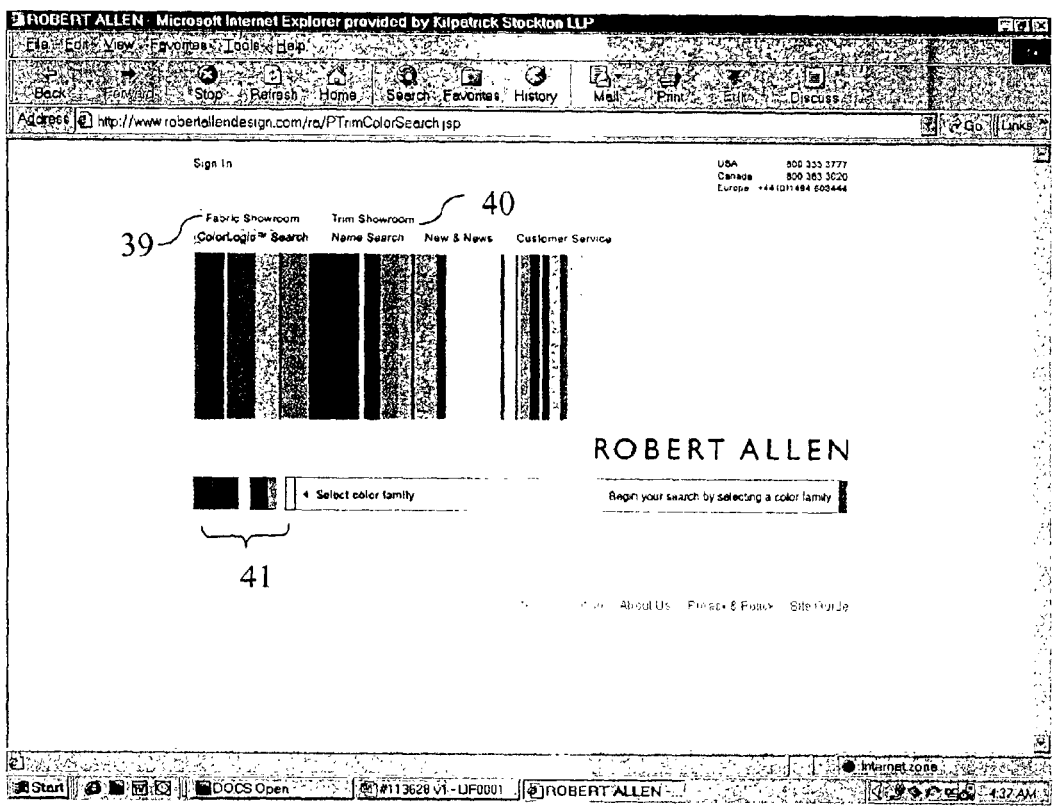
FIGS. 5–12 are screen shots of an embodiment of the present invention.

Screen shots of the website employing an embodiment of the inventive method and system are shown in FIGS. 5–12. Referring to FIG. 5, upon accessing the Internet, users, in this embodiment, can select from two product areas, either Fabric Showroom 39 or the Trim Showroom 40. Additional electronic showrooms are provided in other embodiments and may be created for any product. Other showrooms include, for example, Carpet, Hardware, Leather, and Rugs, etc.

Since color is a consumers' most powerful design and decorating tool, the present invention first prompts a user to select a color family 41 in which he/she would like to investigate. There are many possible color families. The eleven individual color families shown in FIG. 5 are merely illustrative. Different color families may be used. It is also noted that different types of items may lend themselves to certain groups of color families. For example, the group of color families 41 may be chosen because the eleven individual color families that make up the group are the colors most closely associated with upholstery fabrics.

Figure 6:
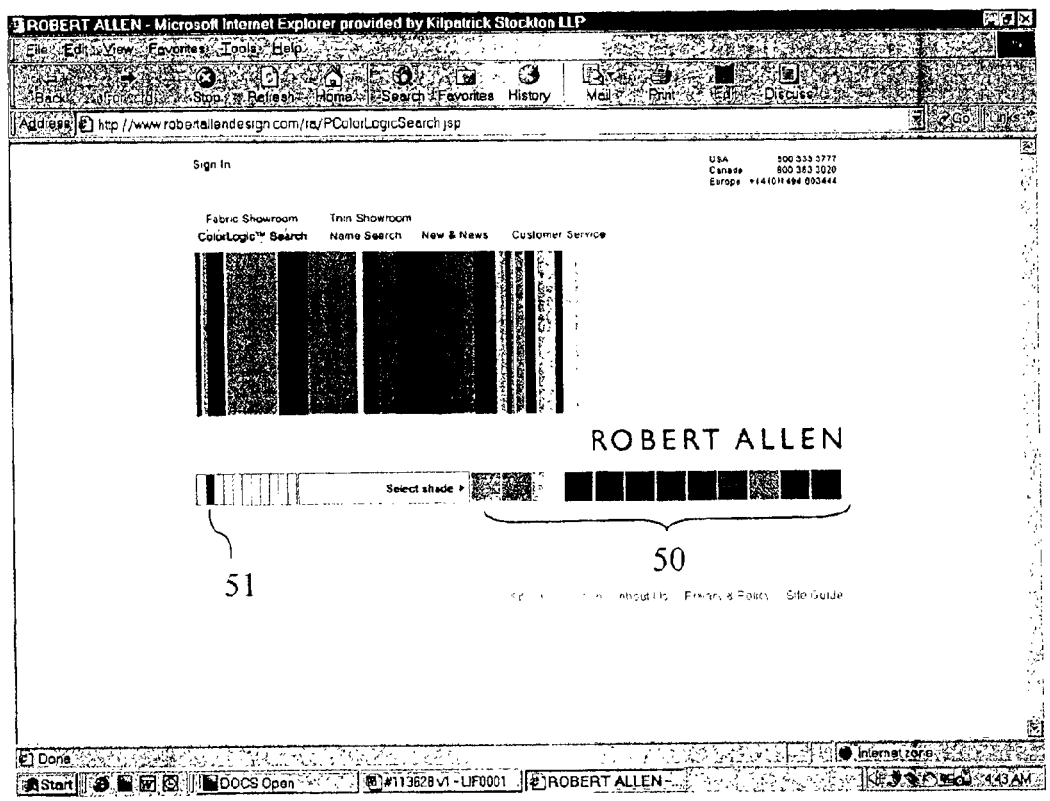

Referring to FIG. 6, once a user selects a color 51 from the color family 41, a select list of variations 50 within the color family is displayed. By allowing the user to select an individual variation, the inventive method and system can better tailor the user's preferences. As previous noted, the term "shade" that appears in FIG. 6 is not meant to be limiting, but rather to generally refer to variations of the initial color selection. Any number of variations (e.g., hue, value, shade, temperature, etc.) may be provided. The ones shown in FIG. 6 are merely illustrative. The choice of "shades" to be displayed for each color need not be arbitrary. In this embodiment, the variations are selected based on marketing research, projected fashion trends and current fashion trends. Other criteria may also be used. In other embodiments, there is also a correlation between the variations that are displayed and the available colors of the item being sought by the user.

Figure 7:
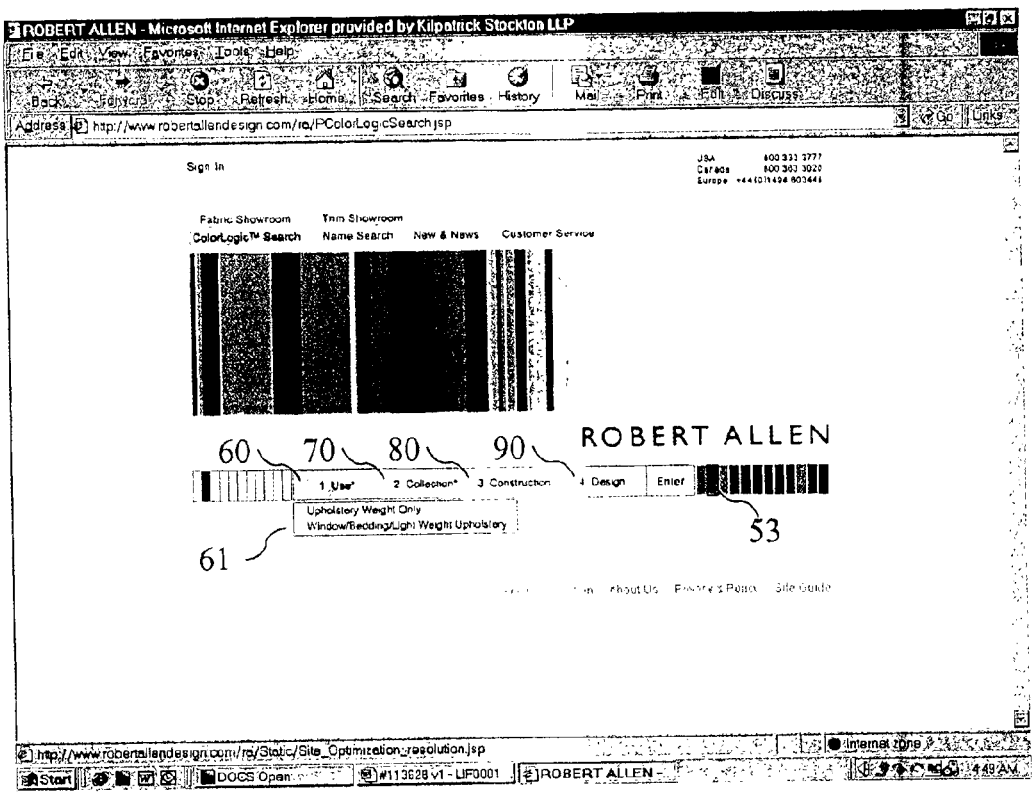

Although color and variation have been chosen, chances are that there are a number of products that meet the criteria. In an effort to further narrow the users search, additional criteria are presented, as shown in FIG. 7 after the user selects the desired "shade" 53. These criteria may include, but are not limited to, physical and aesthetic criteria, such as, Use 60, Collection 70, Construction 80 and Design 90. Selecting within these criteria may be mandatory or optional and may occur in any suitable order. In addition, within each of the criteria may be a "No Preference" option. The "No Preference" option may also serve as the automatic default.

Figure 8:
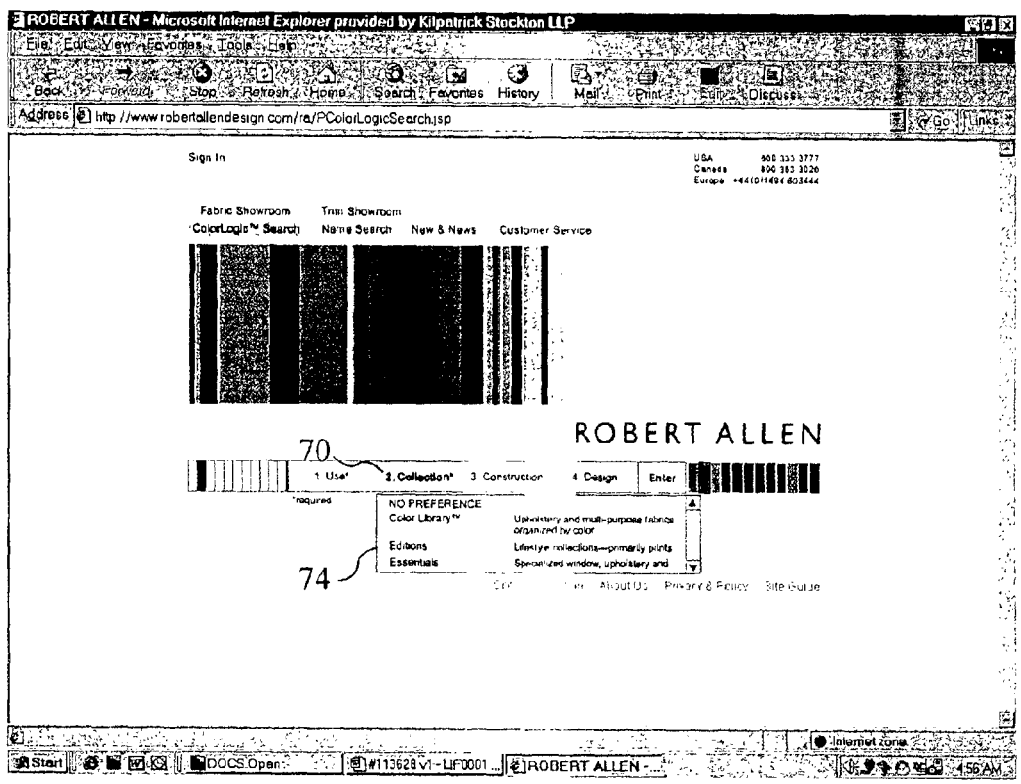

In FIG. 7, "Use" 60 is selected, by for example, moving the cursor over the word "Use." This brings up a "Use" submenu 61, for example a drop down menu, with which a user can scroll, giving the user an addition capability to narrow and refine his/her search. Examples of various "Uses" include, but are not limited to, Upholstery Weight Only and Window/Bedding/Light Weight Upholstery. Selecting "Collection" 70, as shown in FIG. 8, brings up another submenu 74 giving the user a further capability to refine and narrow his/her search. Examples of various "Collections" provided in the submenu 74 include, but are not limited to offerings, such as, Upholstery and multi-purpose fabrics organized by color, Primary prints, Specialized window, upholstery and multi-purpose collections, and Style-inspired print and woven collections. Embodiments of the invention also provide the option to choose from a specific name brand and designer collections.

Figure 9:
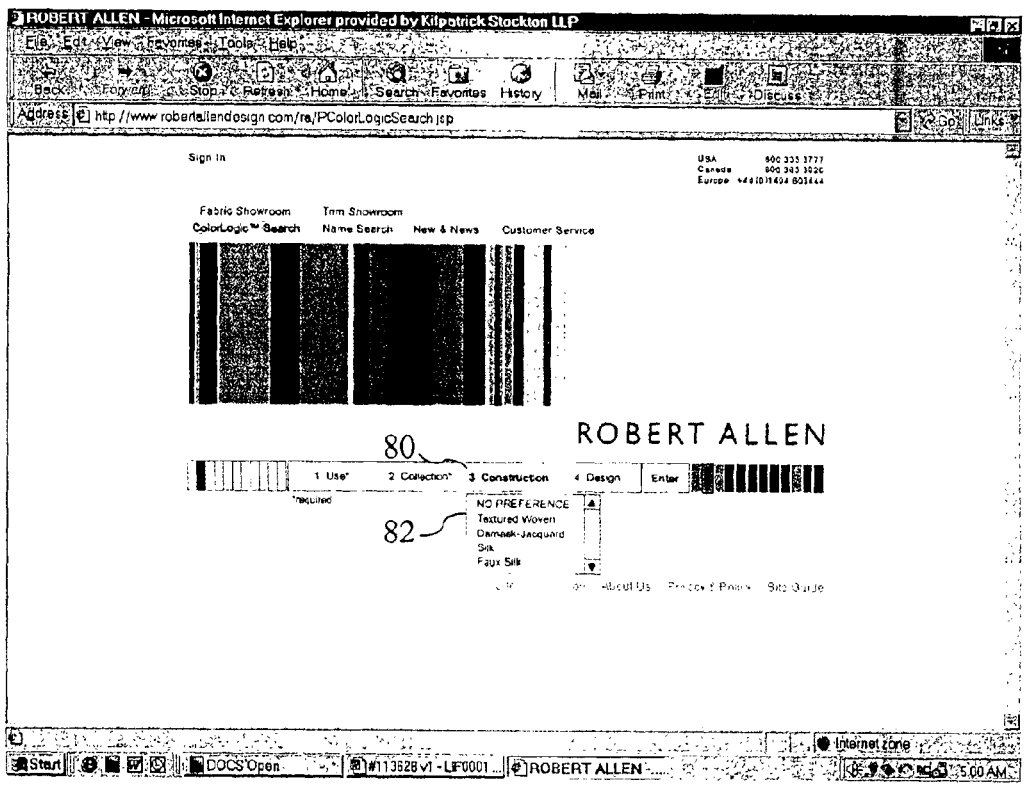

Selecting "Construction" 80, as shown in FIG. 9, also brings up a "Construction" submenu 82 giving the user an additional capability to refine and narrow his/her search. Examples of various types of "Construction" include, but are not limited to, Texture Woven, Damask-Jacquard, Silk, Faux Silk, Velvet-Mohair, Tapestry-Embroidery, Cotton-Duck-Linen, Prints, Sheers-Casements, Suede, Lining, Boucle, Chenille, and Chintz.

Figure 10:
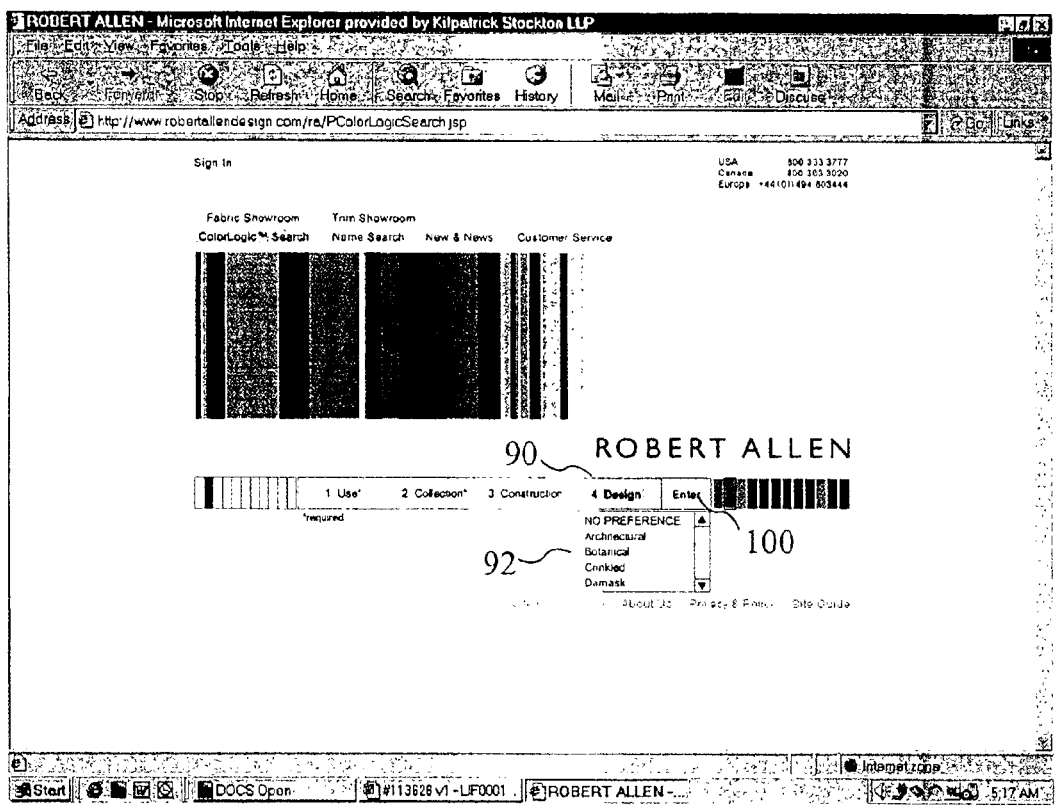

Selecting "Design" 90, as shown in FIG. 10, brings up a "Design" submenu 92 giving the user yet another capability for narrowing or refining his/her search. Examples of various "Design" options include, but are not limited to: Architectural, Botanical, Crinkled, Damask, Ethnic, Flame Stitch, Floral, Geometric/Abstract, Herringbone, Ikat, Juvenile, Moire, Novelty, Paisley, Plaid, Pleated, Small-scale, Solid, Stitchery, Stripe, Toile, and Tropical.

Figure 11:
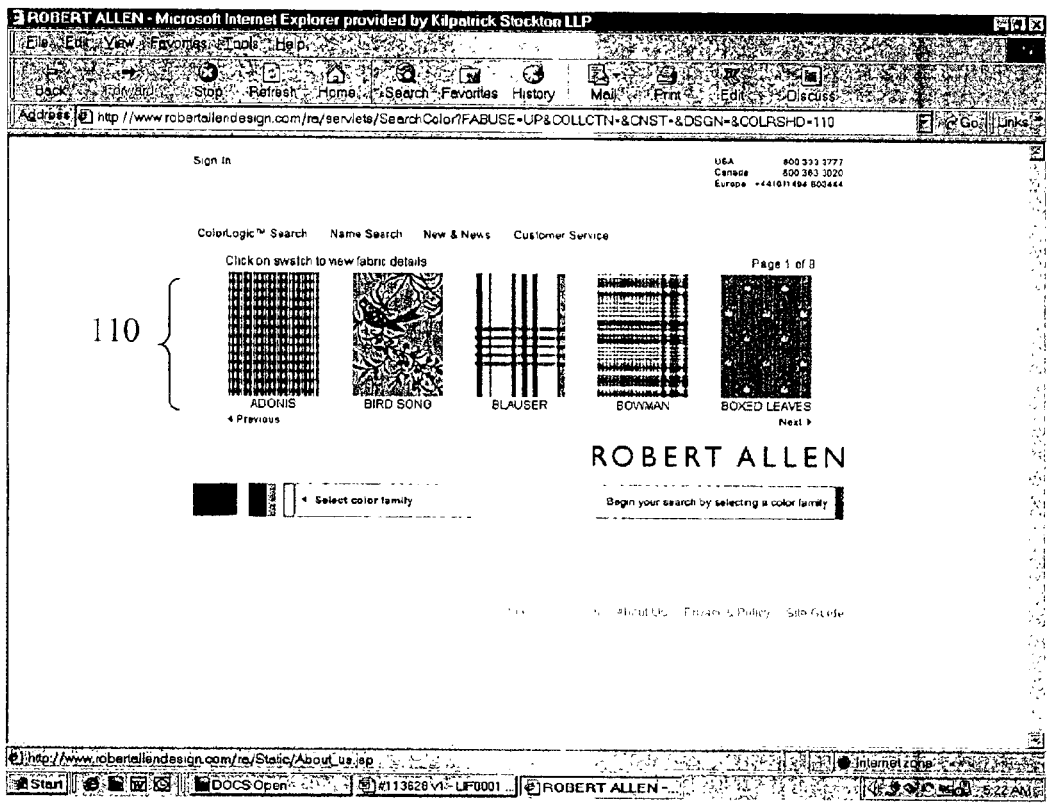
Figure 12:
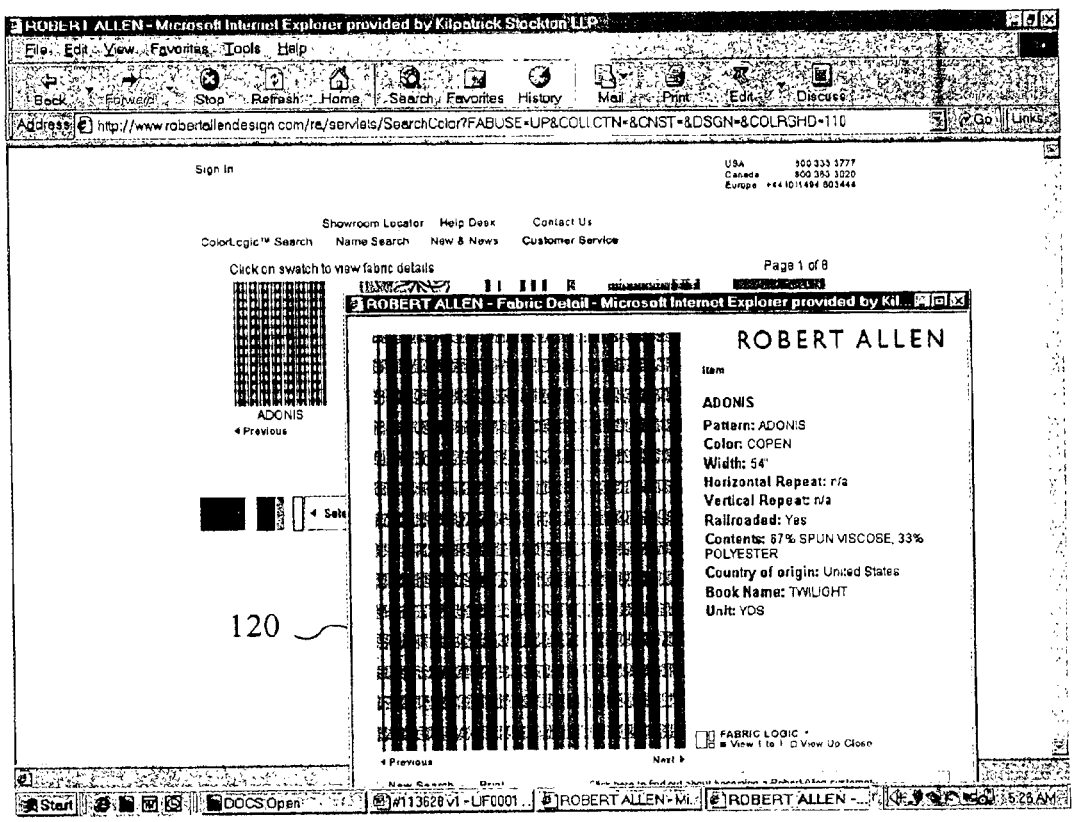

After refining and narrowing the search, the user can request items that match the criteria he/she has selected by selecting, or clicking, "Enter" 100. It is contemplated that other means may also be used to process the user's search request. After "Enter" 100 is selected, the automated method and system culls through its virtual library of materials and products and display thumbnails 110 of the products that match the users selected color, use, collection, construction, and design criteria as shown in FIG. 11. In this embodiment, shown are virtual swatches of fabric that meet the selected criteria. Selecting a specific thumbnail 110 will enlarge the thumbnail picture and provide additional information in, for example, a separate pop-up window 120, as shown in FIG. 12. An embodiment of this pop-up window 120 displays the virtual swatch on a one-to-one scale, just as if the user was flipping through a design book at an actual showroom. The virtual swatch may be displayed at other scales as well. In one embodiment, the additional information in the pop-up window 120 may include, but is not limited to information on name, pattern, color, width, horizontal repeat, vertical repeat, railroaded, contents, country of origin, book name, unit, and price.

The present invention has applications beyond what is disclosed in the above mentioned embodiments. The present invention may be used in a variety of ways in the design and decorating field. One such way is the use of the present invention to allow users to not only search for swatches that match their selected criteria but to also allow the user to see how a chosen swatch may look directly on an item, such as furniture, rugs, carpet, trim, etc.

We claim:

1. An automated method for identifying products that possess certain aesthetic and physical features, comprising the steps of:

displaying a list of product offerings to a user;

displaying samples of colors to apply to a product offering selected by the user;

displaying samples of variations of a color selected by the user;

indicating a variation of a color selected by the user;

displaying an aesthetic criterion for the product for selection by the user;

displaying a list of options categorized within the aesthetic criterion;

displaying a physical criterion for the product for selection by the user;

displaying a list of options categorized within the physical criterion;

comparing the selected product offerings with the variation of color, aesthetic criterion, and physical criterion selected by the user;

displaying an image of at least one product from the selected product offering that corresponds to the variation of color, aesthetic criterion, and physical criterion selected by the user; and providing a description of the at least one product.

2. The method of claim 1, wherein the product is from the group consisting of fabric and trims.

3. The method of claim 2, further comprising the steps of:

displaying an object;

applying the image of the at least one product to an image of the object, thereby modifying an appearance of the object.

4. The method of claim 3, wherein the object is a furnishing.

5. The method of claim 2, wherein the aesthetic criterion is chosen from a group consisting of architectural, botanical, crinkled, damask, ethnic, flame stitch, floral, geometric/abstract, herringbone, ikat, juvenile, moire, novelty, paisley, plaid, pleated, small-scale, solid, stitchery, stripe, toile, and tropical designs.

6. The method of claim 2, wherein the physical criterion is chosen from a group consisting of texture woven, Damask-Jacquard, silk, faux silk, velvet-mohair, tapestry-embroidery, cotton-duck-linen, prints, sheers-casements, suede, lining, boucle, chenille, and chintz construction.

7. The method of claim 1, wherein the description of the at least one product is communicated through a communications network.

8. The method of claim 7, wherein the communications network is the Internet.

9. A system for identifying products that possess certain aesthetic and physical features, comprising:

means for displaying a list of product offerings to a user;

means for displaying samples of colors to apply to a product offering selected by the user;

means for displaying samples of variations of a color selected by the user;

means for indicating a variation of a color selected by the user;

means for displaying an aesthetic criterion for the product for selection by the user;

means for displaying a list of options categorized within the aesthetic criterion;

means for displaying a physical criterion for the product for selection by the user;

means for displaying a list of options categorized within the physical criterion;

means for comparing the product offerings with the variation of color, aesthetic criterion, and physical criterion selected by the user;

means for displaying an image of at least on e product from the selected product offering that corresponds to the variation of color, aesthetic criterion, and physical criterion selected by the user; and means for providing a description of the at least one product.

10. The system of claim 9, wherein the at least one product is from the group consisting of fabric and trims.

11. The system of claim 10, further comprising:
means for displaying an object;
means for applying the image of the at least one product to an image of the object, thereby modifying an appearance of the object.

12. The method of claim 11, wherein the object is a furnishing.

13. An automated method for identifying products that possess certain aesthetic and physical features, comprising the steps of:
selecting a product offering from a list of product offerings;
reviewing samples of colors to apply to the product offering;
selecting a color;
reviewing samples of variations of the selected color;
selecting a variation of the selected color;
identifying an aesthetic criterion for the selected product offering;
selecting an option from a listing within the aesthetic criterion;
identifying a physical criterion for the selected product offering;
selecting an option from a listing within the physical criterion;
viewing an image of at least one product from the selected product offering that corresponds to the variation of color, aesthetic criterion, and physical criterion; and
viewing a description of the at least one product.

14. The method of claim 13, wherein the at least one product is from the group consisting of fabric and trims.

15. The method of claim 13, further comprising the steps of:
identifying an object;
requesting the image of the at least one product be applied to an image of the object, thereby modifying an appearance of the object.

16. The method of claim 15, wherein the object is a furnishing.

17. A computer system for identifying products that possess certain aesthetic and physical features, comprising:
a communications component, wherein the communications component:
displays product offerings to a user;
displays samples of colors to apply to a product offering selected by the user;
displays samples of variations of a color selected by the user;
indicates a variation of a color selected by the user;
displays an aesthetic criterion for the product area for selection by the user;
displays a list of options categorized within the aesthetic criterion;
displays a physical criterion for the product offering for selection by the user; and
displays a list of options categorized within the physical criterion;
a data storage component containing information regarding the product offering for comparison with the variation of color, aesthetic criterion, and physical criterion selected by the user;
wherein the communications component sends the user an image of at least one product from the selected product offering that corresponds to the variation of color, aesthetic criterion, and physical criterion selected by the user; and
wherein the communications component sends the user a description of the at least one product.

18. The system of claim 17, wherein the at least one product is from the group consisting of fabric and trims.

19. The system of claim 18, wherein the communications component sends an image of an object; and modifies the image by applying the image of the at least one product onto the image of the object.

20. The system of claim 19, wherein the object is a furnishing.

* * * * *